Nov. 20, 1928.

F. L. DUNN 1,692,637

MEASURING DEVICE

Filed March 2, 1927

Inventor
F. L. Dunn
By James W. Martin
Attorney

Patented Nov. 20, 1928.

1,692,637

UNITED STATES PATENT OFFICE.

FRANK L. DUNN, OF OMAHA, NEBRASKA.

MEASURING DEVICE.

Application filed March 2, 1927. Serial No. 172,034.

The invention relates to measuring devices and has for its object to provide a device of this character which utilizes plungers moved by a liquid body for moving an object a predetermined distance. Also to provide a screw feed cooperating with the liquid body for imparting movement to the plungers.

A further object is to provide a liquid feed for the plungers comprising a casing having a chamber therein in which liquid is disposed, a threaded member extending into said chamber and adapted to be moved inwardly and outwardly and a second threaded member threaded into the first mentioned threaded member for obtaining relatively minute movement of the liquid body and consequent movement of an object through the plungers. The use of a liquid and plunger system has been found to reduce vibration to a minimum.

A further object is to provide a measuring device whereby minute movements of an object may be obtained, and which device comprises a frame having a plurality of graduated cylinders thereon in which object engaging plungers are slidably mounted, a vertically disposed universally mounted cylinder having a plunger therein for supporting the object, screw threaded liquid displacing members having pipe connections with the cylinders and forming means for moving liquid bodies for imparting movement to an object supported by the vertically disposed cylinder.

A further object is to provide leveling means for the device as a whole.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

Figure 1:
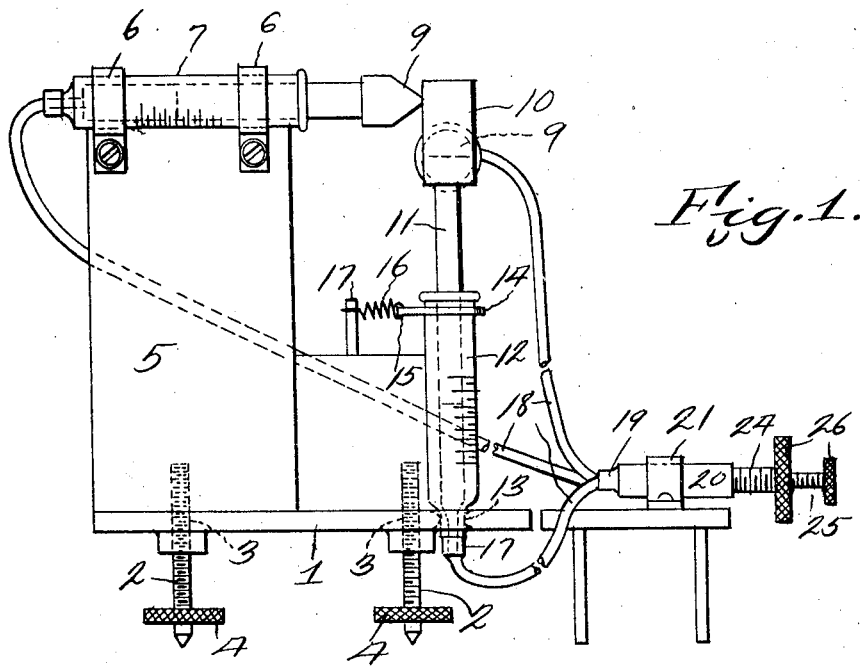
Figure 1 is a view in elevation of the device.
Figure 2:
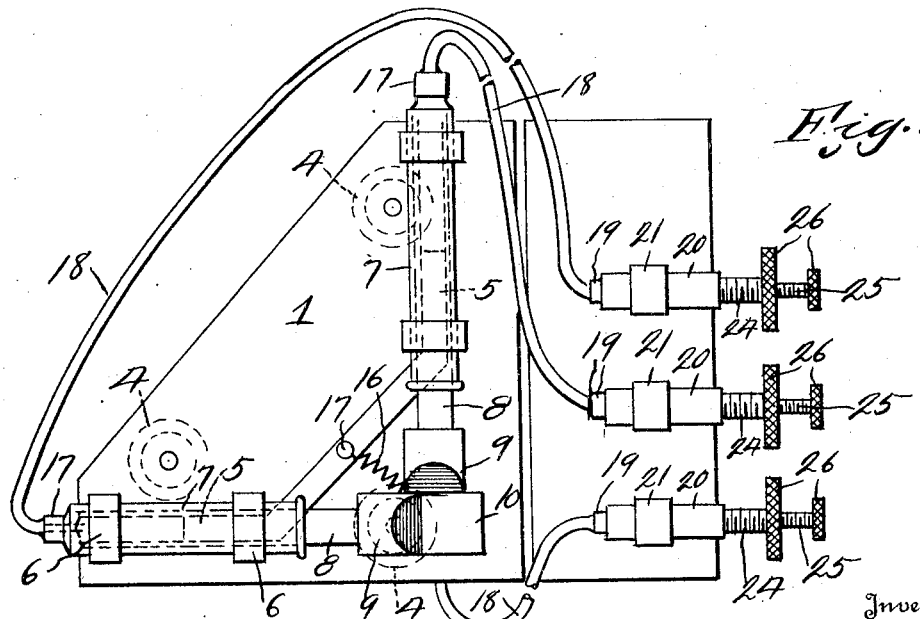
Figure 2 is a top plan view of the device.
Figure 3:
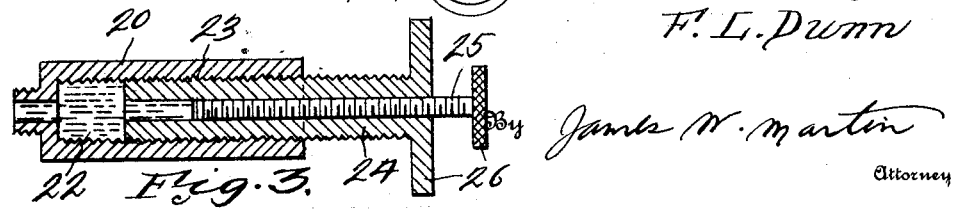
Figure 3 is a vertical longitudinal sectional view through one of the fluid moving devices.

Referring to the drawing, the numeral 1 designates the base plate of the device, which plate is supported on leveling screws 2, which are threaded at 3 through the plate and provided with finger engaging wheels 4 by means of which the leveling operation may be easily and quickly accomplished. Extending upwardly from the plate 1 are vertically disposed plates 5 which are preferably at right angles to each other, and it is to be understood that any number of plates 5 may be used as desired. Secured to the upper ends of the plates 5 by means of clips 6 are graduated transparent cylinders 7, in which are slidably mounted plungers 8, and against which plungers liquid acts for moving the same. The outer ends of the plungers 8 are provided with heads 9 which engage an object 10 to be moved and the object 10 is supported on a plunger 11 which extends downwardly into a vertically disposed transparent cylinder 12 having graduations and which cylinder is universally supported at 13 in a manner whereby it may tilt in any direction. Although only two cylinders 7 are used, it is to be understood any number desired may be used and that two are shown for purposes of illustration only. The upper end of the transparent cylinder 12 is provided with a yoke 14 to which is connected at 15 a contractable spring 16, which spring extends inwardly and is anchored to the post 17 which is located in a position where the cylinder 12 will be pulled inwardly towards the tilting devices at all times, but against which spring the tilting devices or heads 9 work.

Connected to the ends of all of the cylinders 7 and 12 at 17 are tubes 18, and which tubes have their other ends connected at 19 to liquid cylinders 20 secured to the base by means of clips 21. All of the liquid cylinders 20 are of the same construction, and for purposes of illustration one only is shown and is specifically described.

The liquid cylinder 20 is provided with a liquid chamber 22 and the liquid entirely fills said chamber, the tubing 18 and the cylinders 7 and 12, in other words the air is entirely displaced. Threaded at 23 into the liquid cylinder 20 is an adjustable sleeve 24 which is adapted to be moved inwardly for forcing liquid or the body of liquid towards the pistons 8 for imparting outward movement thereto and consequent movement of the object 10, and which object may be raised through the medium of the cylinder 10. For finer adjustment an adjusting screw 25 is provided which is threaded into the sleeve 24, and has preferably finer thread thereon, therefore it will be seen that a minute microscopic movement of the liquid body may be obtained. Sleeve 24 and screw 25 are provided with finger engaging members 26, adapted to be grasped by the operator for adjusting the device. Finely regulated movement is obtained by using a screw plunger and a syringe the ratio of movement varying inversely as the cross sections of the screw plunger and syringe.

It has been found that liquid transmission of pressure is particularly adapted to a fine movement because of the incompressibility of liquids and the corresponding absence of elastic vibration at ordinary pressures. The force of compression movement is limited only by the bursting strength of the apparatus while the suction movement is limited by the vapor pressure of the liquid used. In the case of oil at a room temperature, this is low.

From the above it will be seen that a device is provided whereby relatively small movements may be imparted or measurements taken, that the device is simple in construction, the parts reduced to a minimum and the same can be cheaply manufactured and sold.

The invention having been set forth what is claimed as new and useful is:—

1. A device of the character described comprising a frame, graduated transparent members carried by said frame, object engaging plungers extending into said transparent members, liquid cylinders, pipe connections between said liquid cylinders and the transparent cylinders, the liquid entirely displacing the air within the tubes, transparent members and fluid cylinders and a fluid moving screw threaded into the liquid cylinder.

2. A measuring device comprising a frame, plunger cylinders disposed at an angle to each other and carried by said frame, object engaging plungers in said plunger cylinders, liquid cylinders, pipe connections between the liquid cylinders and the plunger cylinders, sleeves threaded into the liquid cylinders and a liquid moving screw threaded into each of said sleeves.

3. A measuring device of the character described comprising a plate, vertically disposed members carried by said plate, plunger cylinders supported by said members and adapted to receive liquid, movable plungers in said plunger cylinders, liquid cylinders adapted to receive liquid, tubes connecting the liquid cylinders and the plunger cylinders and adapted to receive liquid, adjusting screws threaded into each other and into the liquid cylinders and means for supporting an object adjacent the ends of the plungers.

In testimony whereof I hereunto affix my signature.

FRANK L. DUNN.